ize:16px;">United States Patent [19]

Ahlstone

[11] 4,124,233
[45] Nov. 7, 1978

[54] RIGID PIPE CONNECTOR WITH LOCK RING AND METHOD OF MAKING THE SAME

[75] Inventor: Arthur G. Ahlstone, Ventura, Calif.

[73] Assignee: Vetco, Inc., Ventura, Calif.

[21] Appl. No.: 793,528

[22] Filed: May 4, 1977

[51] Int. Cl.² .............................................. F16L 35/00
[52] U.S. Cl. ..................................... 285/18; 285/381; 285/308; 285/321; 29/446
[58] Field of Search ................... 285/18, 381, 90, 81, 285/89, 308, 321, 82, 356, 354, 330, 146; 29/446

[56] References Cited

U.S. PATENT DOCUMENTS

| | | | |
|---|---|---|---|
| 2,267,716 | 12/1941 | Boynton | 285/330 |
| 2,671,949 | 3/1954 | Welton | 285/94 X |
| 3,114,566 | 12/1963 | Coberly et al. | 29/426 X |
| 3,345,087 | 10/1967 | Hanes et al. | 285/321 X |

FOREIGN PATENT DOCUMENTS 1,817,319  7/1970  Fed. Rep. of Germany ........... 285/356

Primary Examiner—Werner H. Schroeder
Assistant Examiner—C. J. Arbes
Attorney, Agent, or Firm—Bernard Kriegel

[57] ABSTRACT

A pipe connector has a pin initially stabbed into a box, the pin and box then being axially loaded together at confronting transverse surfaces while the pin and box are pressurized to expand the box and compress the pin, so that when the pressure is relieved a pressure energized shrink fit is provided and the connector is rendered rigid to enhance tensile, compressive and bending strength and provide a fluid tight joint useful in making up lengths of pipe such as piles and pipelines. A lock ring holds the connector against axial separation to maintain the pin under axial compression and maintain the box under axial tension.

26 Claims, 8 Drawing Figures

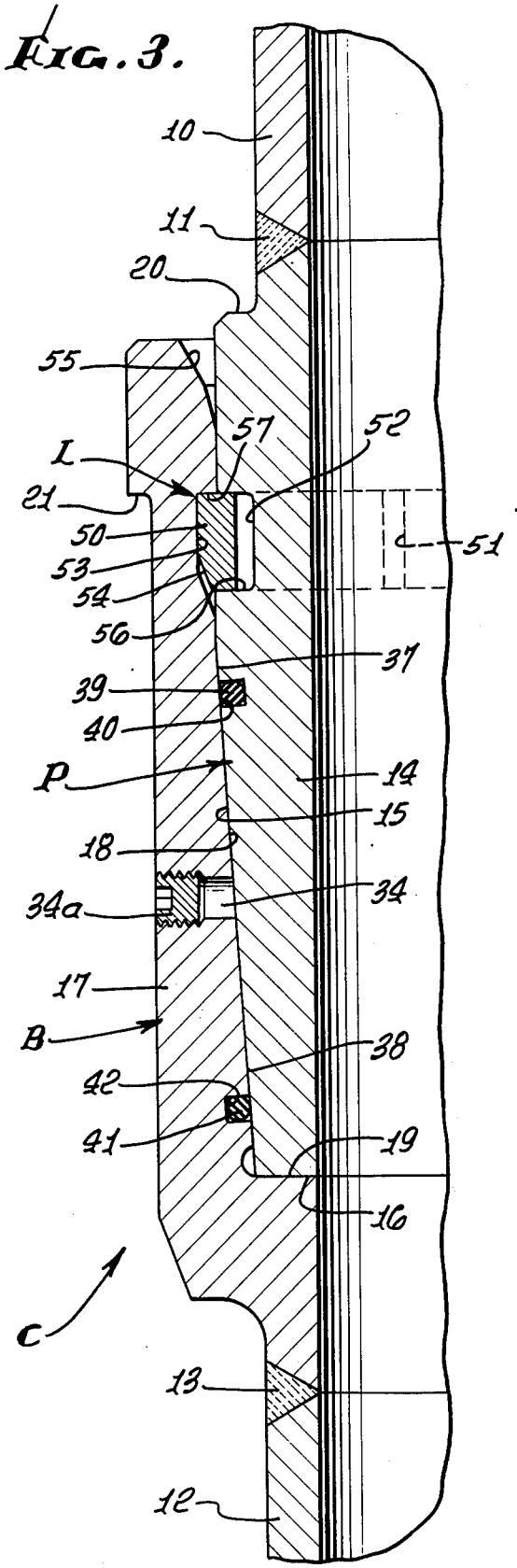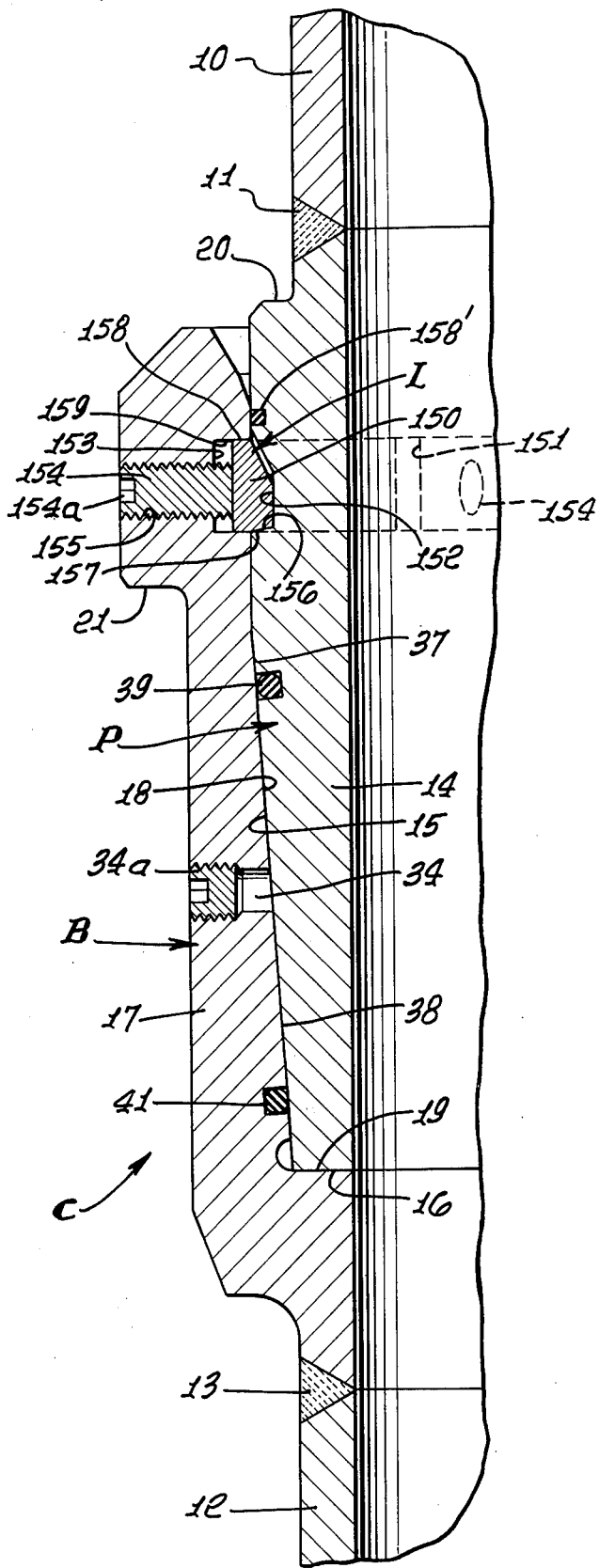

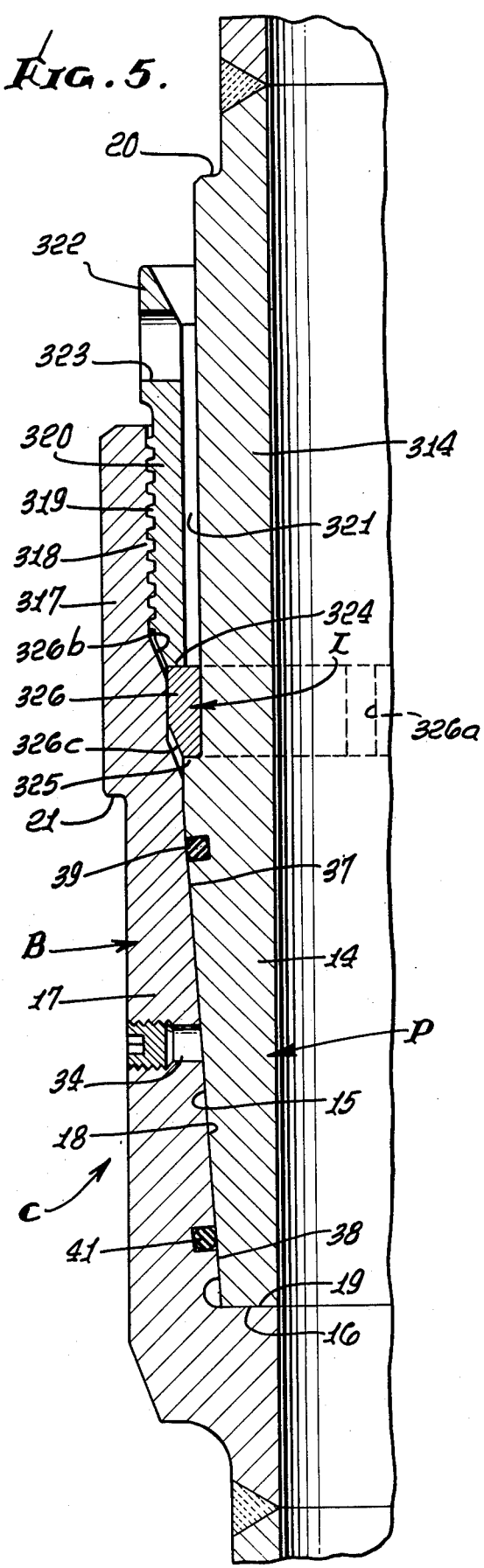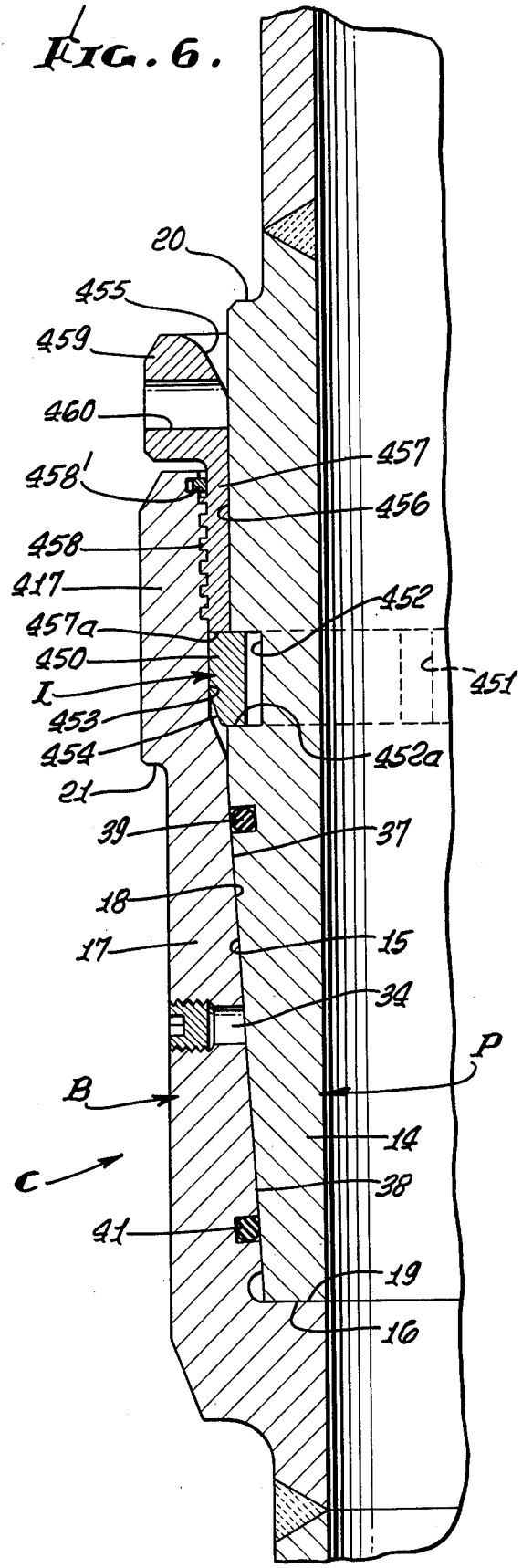

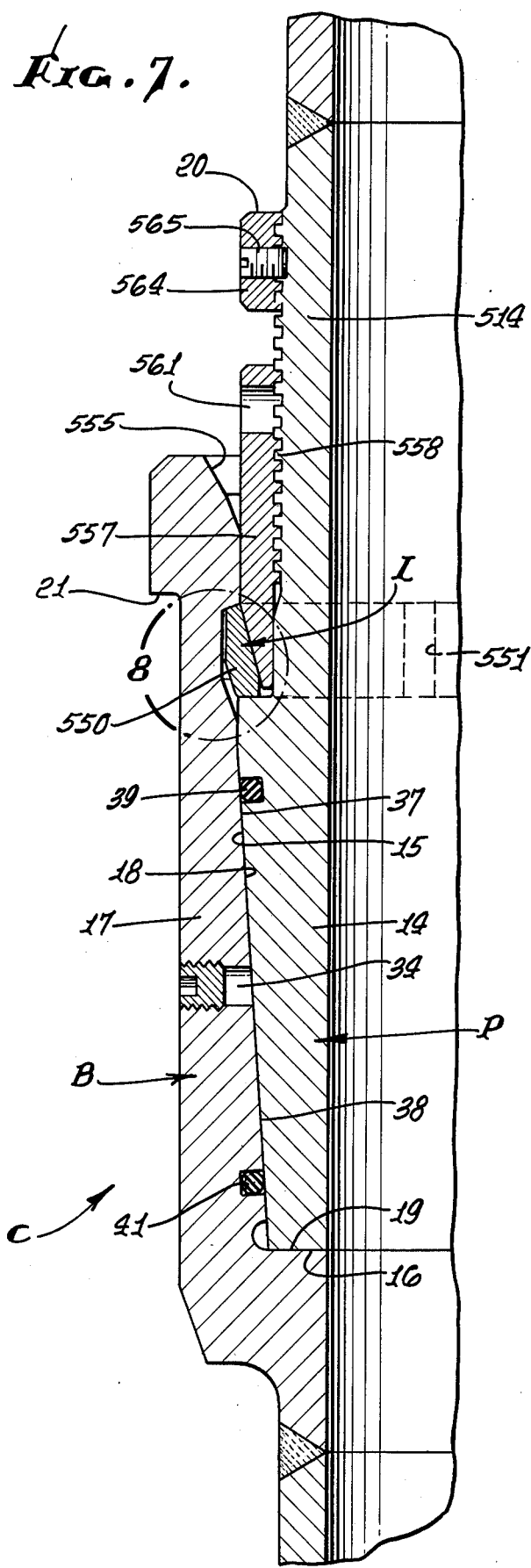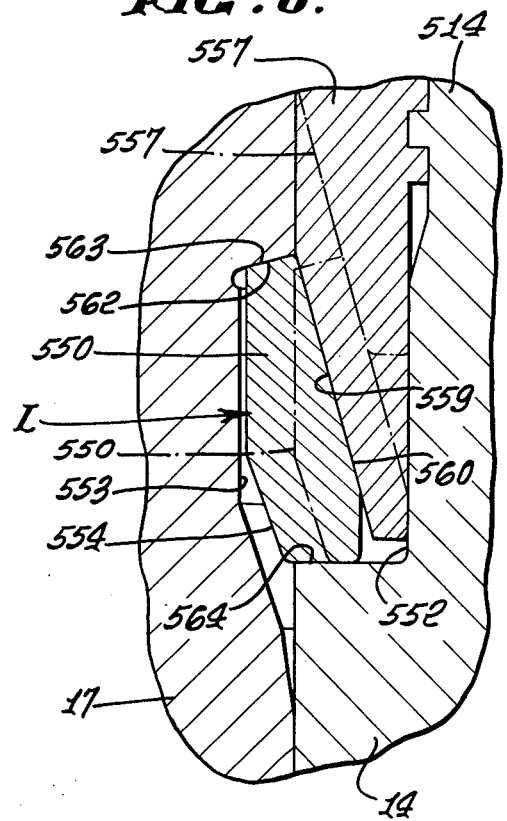

RIGID PIPE CONNECTOR WITH LOCK RING AND METHOD OF MAKING THE SAME

Heretofore, it has been known that pipe joints or connections may be made up with an interference fit between the pin and the box, by applying fluid pressure between the opposing threaded portions of the pin and the box while the joint parts are rotated to cause the pin and box to shoulder, thereby avoiding the necessity for heating the joint parts to effect a shrink fit. For example, reference may be had to U.S. Pat. No. 2,671,949, granted Mar. 16, 1954, in the name of R. L. Welton, for "Method of Making Tool Joints".

It is also known that pipe line connectors or pile connectors of relatively large diameter can be improved in terms of strength and resistance to separation due to rebound during pile driving operations, if the pin and box are provided with confronting shoulders which are loaded into axial compressive engagement. For example, reference is made to the pending application for U.S. patent Ser. No. 712,491, filed Aug. 9, 1976, in the name of L. E. Reimert, for "Rigid Connector And Piling".

In the pending application of Martin B. Jansen, Jr., Ser. No. 742,072, filed Nov. 5, 1976, there is disclosed a threaded connector for a pipe string, such as a production riser used in connection with sub-aqueous wells, in which the threaded connection between the pin member and the box member of the connector is made up initially through an application of relatively low torque to the members, after which the connector has a straight line pretensioning force of a high tensile value applied to it through use of a suitable tool, the high pretensioned force being retained between the mating threads of the pin and box member by a preload reaction member threaded on the pin member and rotated into solid engagement with the box while the pretensioned force is being applied, to lock the preload into the connector between the threads.

In the laying of pipelines, such as offshore pipelines, the joints of pipe are commonly welded, usually on lay barges having work stations for horizontally lining up lengths of pipe, welding the joints, grinding the joints, and subsequent inspection and coating. Such lay barges are very costly, even when used for laying relatively small pipelines in shallow water, and range upwardly, when used for laying larger pipelines offshore.

At the present time, such lay barges may cost up to $350,000.00 per day. When greater water depths are encountered, horizontal pipeline laying becomes impractical, but vertical pipeline installation from semi-submersible rigs constitutes a practical and relatively economical pipeline installation procedure. Welding of the joints or connections is generally preferred, since most connectors are not rigid or are not locked up and must generally be stabbed at a batter angle while the mating joint parts are controlled during makeup by elaborate devices.

There is, accordingly, a need for connectors for pipe-line connections and pile connections which can be made up vertically, or with the pipe at a batter angle, say while supported and handled by equipment such as that present on drilling rigs or semi-submersible drilling rigs, which connectors are durable, safe, easy to make up and have pressure resistance, tensile, compression and bending strength characteristics in excess of such characteristics of the pipe body.

The present invention satisfies the need for such connectors by providing a rigid, stab-type connector or pin and box joint which is pre-loaded together axially to force opposed transverse pin and box surfaces into compressive engagement, while the pin and box are subjected to pressure between their confronting or companion interfitting surfaces, to expand the box and compress the pin radially. When the pressure is relieved, the connector is rigid, has an interference fit and is axially pre-loaded so as to have bearing contact for pile driving which resists axial separation due to rebound effects, and has superior tensile, compression, bending and pressure capability, exceeding that of the pipe joined by the connector. Such joints are, therefore, idealy suited for, but not limited to, use in marine piles and pipelines.

In accomplishing the foregoing, the connector has a box section having an internal transverse surface or shoulder and is adapted to have a pin section inserted therein with the inner transverse end surface of the pin disposed for abutting engagement with the shoulder in the box. Axially spaced companion tapered metal sealing surfaces in the box and on the pin are coengaged, and if desired supplemental ring seals may be provided between the metal-to-metal sealing surfaces. The box has a pressure fitting enabling fluid to be supplied under pressure between the pin and box within the region spanned by the sealing portions to pressure energize the box and pin and effect resilient expansion of the box and contraction of the pin, while a pre-load tool is applied to opposing radial shoulders or tool engaging projections on the box and on the pin. Actuation of the tool enables the connector to be finally or fully made up with a predetermined compressive load on the coengaged box and pin transverse surfaces or shoulders, with the box under tension and the pin under compression, and when the energizing pressure on the box and pin is then released, while the parts are held in the pre-loaded condition by the pre-load tool, the box contracts and the pin expands to provide an interference or shrink fit interlocking the connector parts together in their pre-loaded condition.

As disclosed in my companion application, Ser. No. 726,947, filed May 4, 1977, for "Rigid Connector for Pipe and Method of Making the Same", the box and pin are held in the preloaded condition by the interference fit of opposed tapered surfaces and including in some forms, locking means, shown as threads or ribs, which prevent axial separation of the pin and box or relaxation of the compressive pre-load, even during rebound when the connector is used in a pile subjected to the blows of a pile driver. The tapered metal-to-metal sealing surfaces prevent leakage from or into the joint and the combination of the axial pre-load, and the pressure energized fit provides a connector having the advantageous characteristics described above.

According to the present invention, locking means coact between the upper end of the tapered pin section and the upper or free end of the tapered box section to hold the confronting, axially pre-loaded shoulders together, with the pin in compression and the box in tension, whereby the connector maintains its rigidity. The locking means is automatic or is loaded into locking position while the connector is held in its pre-loaded condition. The locking means comprise ring elements engageable between opposing radial shoulders on the pin and box members.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense.

Referring to the drawings:

FIG. 3 is an enlarged fragmentary longitudinal section of the pipe connector of FIG. 2 in a fully made up condition;

FIG. 4 is an enlarged fragmentary longitudinal section showing another form of rigid pipe connector;

FIG. 5 is an enlarged fragmentary longitudinal section showing still another form of rigid pipe connector;

FIG. 6 is an enlarged fragmentary longitudinal section showing yet another form of rigid pipe connector;

FIG. 7 is an enlarged fragmentary longitudinal section showing still another form of rigid pipe connector; and FIG. 8 is an enlarged fragmentary detailed view embraced by the circle designated 8 in FIG. 7.

Figure 1:
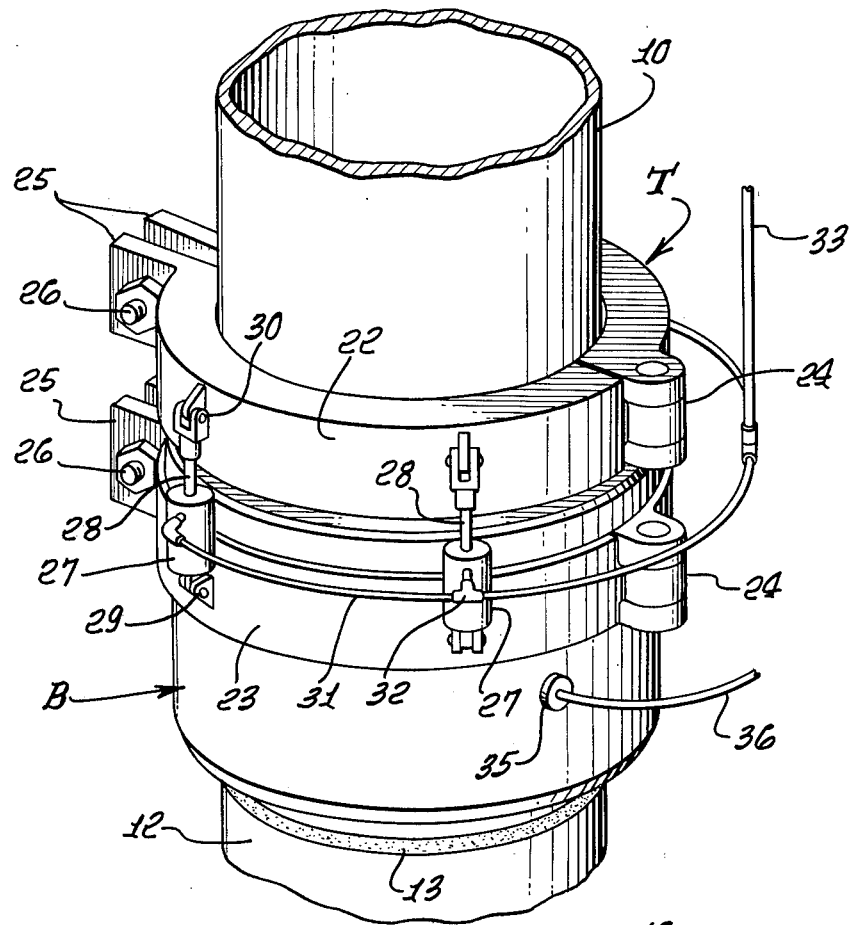
FIG. 1 is a perspective illustrating a pipe and a connector during assembly and in a clamping tool for axially loading the connector while it is pressurized.

As seen in the drawings, a pipe connector C made in accordance with the invention, comprises an upper pin section P and a lower box section B adapted to interconnect pipe lengths, including an upper pipe section 10, secured by a circumferentially continuous weld 11 to the upper end of the pin P, and a lower pipe section 12, secured by a circumferentially continuous weld 13 to the lower end of the box section B. The connector C is shown and will be described as one wherein the connection is stabbed together by insertion of the downwardly extending pin into the upwardly facing box. It should be understood, however, that in the case of some uses of the connector, this relationship of pin to box may be reversed and the box moved over the pin. Preferably, the inner, upper end of the box B is outwardly flared to facilitate stabbing of the pin into the box, and the tapered form of the parts progressively aligns the parts, as the pin moves into the box. The taper angle is preferably a locking angle.

The pin section P includes a circular body section 14 having an external downwardly tapering surface 15 and a lower end surface 16 which extends transversely of the pin body 14. The box section B comprises a circular body section 17 having an internal downwardly tapered surface 18 complemental to the tapered surface 15 of the pin body, whereby when the pin body is inserted or stabbed into the box, the complemental tapered surfaces 15 and 18 are disposed in confronting coengagement. The box body 17 also includes an inner lower transversly extended shoulder or surface 19 against which the pin surface 16 abuts when the connector is made up. The strength of such joints, as thus far described, in terms of resistance to axial separation or tensile strength, compressive and bending strength, as well as the ability of the connector to withstand fluid pressure, both from within and from without, is dependent upon the extent to which the confronting transverse surfaces 16 and 19 are axially preloaded and the extent to which there is a tight interference fit between the confronting tapered surfaces 15 and 18 of the respective pin and box members.

The present invention provides a joint of superior strength characteristics by reason of the fact that the pin and box sections of the joint or connector are made up in a novel manner. In the vicinity of the upper end of the pin body 14, it is provided with a radially extended, upwardly facing, thrust or pre-load shoulder 20, and adjacent the upper end of the box body 17, it is provided with an external radially outwardly projecting, downwardly facing, thrust shoulder 21. These thrust or preload shoulders 20 and 21 are adapted to provide means engageable by a suitable makeup or loading tool T, whereby as indicated by the respective arrows 20a and 21a in FIG. 2, a compressive axial force can be applied to the pin body 14 to load the pin end 16 against the inner box surface 19 while the box body 17 is under tension.

The tool T may be of any suitable form to provide opposing forces as represented by the arrows 20a and 21a, and as illustrated in FIG. 1, such a tool may comprise an upper ring 22 and a lower ring 23, each of the rings 22 and 23 having suitable hinge means 24 hingedly interconnecting ring half parts together so that the ring may be opened for lateral application about the pipe and about the connector. Each ring 22 and 23 also is provided with suitable means, such as outstanding ears 25, at the free ends of the ring half parts, and adapted to receive bolts 26 whereby the rings 22 and 23 may be assembled and secured about the pipe and connector for engagement with the respective thrust shoulders 20 and 21 on the pin and on the box. Means are provided for pulling the rings 22 and 23 axially towards one another, when the rings are disposed about the pipe and connector, so as to apply the opposite forces referred to above. As shown, the pulling means comprises a suitable number of circumferentially spaced hydraulic cylinders 27 having rods 28 projecting therefrom, with the respective cylinders connected to one of the rings as at 29 and the rods connected to the other of the rings as at 30. A hydraulic line 31 is adapted through suitable fittings 32 to supply hydraulic fluid under pressure to the cylinders 27 from a source conduit 33 which is connected to the conduit 31 and to a suitable fluid pressure source (not shown). Thus, when hydraulic fluid is supplied to the cylinders 27 to retract the rods 28 and force the rings 22 and 23 towards one another, the pin and box bodies 14 and 17 can be axially preloaded.

In addition, as mentioned above, the strength of the connector is also dependent upon the interference fit between the opposing tapered pin surface 15 and box surface 18. Accordingly, the box body 17 is provided with at least one radial pressure port 34 threaded to receive a connector fitting 35 for a hydraulic line 36, whereby fluid under pressure can be supplied between the confronting tapered surfaces 15 and 18 of the pin and box between an upper opposed sealing region 37 and a lower opposed sealing region 38 between the tapered pin and box surfaces. The sealing effectiveness of the upper and lower tapered, metal-to-metal sealing regions 37 and 38 may be enhanced by the provision of an upper, annular and resilient sealing ring 39 disposed in a groove 40 in the pin or the box body and a lower, annular and resilient sealing ring 41 disposed in a groove 42 in the pin or the box body, the sealing rings 39 and 41 being sealingly engaged with the opposed tapered surfaces of the respective members.

Figure 2:
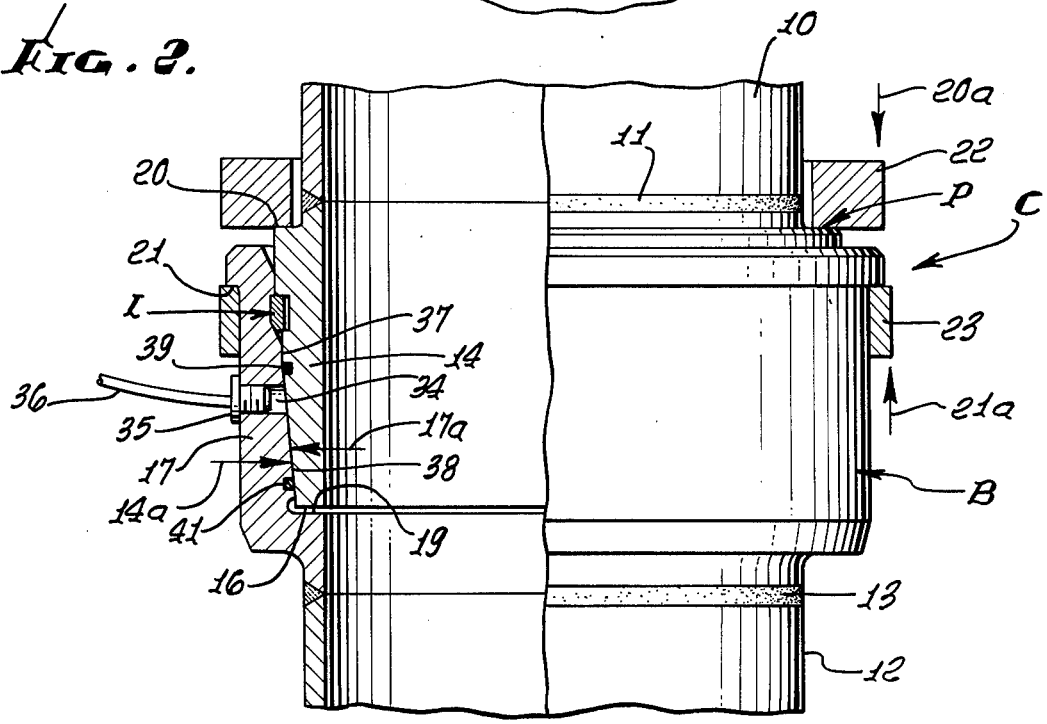
FIG. 2 is a partial elevation and partial longitudinal section of one form of pipe connector, with the clamping tool broken away, and showing the connector parts stabbed together prior to final makeup.

As seen in FIG. 2, and somewhat exaggerated, when the pin P is stabbed into the box B to the extent that a seal is provided at the upper and lower sealing regions 37 and 38 therebetween, the lower end 16 of the pin P is not fully axially loaded against the confronting box shoulder 19, and as previously indicated, such loading is accomplished in response to the application of the opposing forces by the loading tool T. During the operation of the tool T to axially pre-load the connector, hydraulic fluid under pressure is admitted through the port 34, between the upper and lower sealing regions 37 and 38, sufficient to apply substantial circumferential compressive force to the pin body 14, as indicated by the arrow 14a in FIG. 2, and substantial expansive force, as indicated by the arrow 17a, to the body 17 of the box.

The connector is finally made up while the fluid pressure is maintained, by actuation of the tool T to axially load the confronting pin and box surfaces 16 and 19, while the pin body 14 is under compression and the box body 17 is under tension. Accordingly, when the fluid pressure is relieved there will be effected a pressure energized interference fit between the tapered pin surface 15 and box surface 18, while the confronting transverse surfaces 16 and 19 of the pin and box are in an axially pre-loaded condition. As a result, the completed joint or connector, as seen in FIG. 3, will have superior strength characteristics in terms of tensile, compressive and bending strength and a fluid tight joint is provided which is useful in making up lengths of pipe such as piles and pipelines.

When the hydraulic line connector 35 has been removed from the pressure port 34, it is preferred that the port 34 be plugged by a suitable screw plug 34a as seen in FIG. 3.

Such a connection of pipe sections 10 and 12 can be easily and quickly made with the usual pipe handling equipment found on drilling barges and the like and with the pipe sections disposed vertically or at batter angles while being initially stabbed together and the making up of the connection can be accomplished more quickly than welded connections have been heretofore made. Thus, the invention not only provides a strong and durable connection which can withstand the severe service of subsea pipelines and piles, but economies are effected in terms of the speed with which the connections can be made up utilizing the very expensive rig or barge equipment.

The present invention involves locking means L cooperably engageable between the pin and the box in such a manner that the pin body secton 14 is held compressively with its end surface 16 engaged with the opposing shoulder 19 of the box, and with the box body section 17 held in tension, while the tapered pin and box surfaces are coengaged by the pressure energized shrink fit, upon the relief of the pressure fluid from the region between the opposed metal-to-metal sealing sections 37 and 38.

Referring to FIG. 3 the made-up connection C is better illustrated in an enlarged scale. In this form, the locking means L comprises a locking element 50 carried by the pin P and adapted to automatically engage within the box B when the opposing transverse pin and box surfaces 16 and 19 are fully loaded together by the loading tool T. More specifically, the locking element 50 is in the form of a locking ring which is of split construction, as indicated by the broken line in FIG. 3 at 51, and is disposed within a circumferentially extended external groove 52 in the pin body 14 above the tapered surface 15. The split ring 50 is inherently resiliently expansible so as to project outwardly of the outer periphery of the pin P for engagement within a circumferentially extended internal groove 53 adjacent the upper end of the box body 17 above the tapered surface 18 of the latter. Preferably, the lower outer corner of the lock ring 15 is downwardly and inwardly beveled to provide the surface 54 which is engageable with the outwardly flared surface 55 at the upper inner end of the box body, so that when the pin is being stabbed into the box, the coengaging surfaces 54 on the ring and 55 on the box will cam the lock ring 50 inwardly to enable movement of the pin into the box.

The groove 52 within the pin body is defined by a lower horizontal shoulder 56 and the groove 53 in the box is defined by an upper horizontal shoulder 57, the pin shoulder 56 facing upwardly and the box shoulder 57 facing downwardly for engagement with the respective lower and upper surfaces of the lock ring 50 when the lock ring 50 expands outwardly into the groove 53 upon final makeup of the connection. In this embodiment, the engagement of the upper end of the lock ring 50 beneath the box shoulder 57 and the lower end of the lock ring 50 against the pin shoulder 56 is automatic when the parts are finally preloaded by the tool T, and when the tool is released, the coengaged lock ring and pin and box shoulders maintain the confronting pin and box surfaces 16 and 19 preloaded, with the pin body in compression and the box body in tension, with the confronting tapered surfaces 15 and 18 lockingly coengaged by the pressure energized shrink fit, when the pressure fluid is released.

Referring to FIG. 4 a modified construction is shown wherein the locking ring means L is in the form of a split, resiliently contractable split locking ring 150. As before, the pin body 14 has the tapered outer surface 15 seating in the tapered surface 18 of the box body 17, with the lower end 16 of the pin compressively engaged against the upwardly facing internal box shoulder 19. As shown, the connector C is fully madeup, and pressure fluid has been supplied through the passage 34 to the region between the upper and lower sealing portions or sections 37 and 38 of the pin and box bodies while the connection has been axially preloaded by the application of the loading tool T to the upwardly facing loading shoulder 20 on the pin and to the downwardly facing shoulder 21 on the box, whereby the pin body 14 is compressively preloaded and the box body 17 is in tension. The locking ring 150 constitutes means for retaining the pin and box in such a preloaded condition.

More particularly, the locking ring 150 is a split ring, as indicated in broken lines at 151, and adapted to be circumferentially contracted into an outer peripheral groove 152 formed in the pin body 14 above the upper sealing section 37 of the connection from an internal circumferentially extended groove 153 in the upper end of the box body section 17. In its normal or expanded condition, the lock ring 150 would be wholly confined within the box groove 153, so as to enable the initial stabbing of the pin into the box, without interference with the lock ring 150. The lock ring 150 is subsequently resiliently contracted by the application of an inward force thereto by a suitable number of circumferentially spaced screws 154 threadedly engaged in holes 155 in the box body, the screws having suitable means such as a socket 154a to receive a wrench for rotating the same. The lower wall 156 of the groove 152 is disposed at an angle extending downwardly and outwardly from the base of the groove, and the lower inner portion of the lock ring 150 has a correspondingly inwardly and upwardly angled surface 157, these angled surfaces 156 and 157 being coengaged upon inward contraction of the locking ring 150, while the upper end 158 of the locking ring is slidably engaged with a circumferentially downwardly facing shoulder 159 which forms the upper side of the box groove 153. Due to the wedge angle of the pin surface 156 and the ring surface 157 and due to the fact that the ring engages beneath the box shoulder 159, the ring 150 is compressively preloaded as it is forced inwardly into the pin groove 152, so that no relaxation of the preloaded state of the joint or connector can occur when the loading tool T is removed, and the pin body beneath the ring is maintained in compression against the box shoulder 19, while the box body 17 is held in tension. It is apparent that, if desired, the screws 154 may be sufficiently numerous and the wedge angle between the ring and pin surfaces 156 and 157 may be such that the ring 150, while being loaded inwardly into the pin groove 152, may apply a further preload to the connection. If desired, a sealing ring 158' may be disposed between the confronting cylindrical surfaces of the pin and box above the locking means L, to prevent entry of water or other foreign matter into the area of the locking means L.

Referring to FIG. 5, another form of connector C is illustrated. In this form the basic pin and box structure is the same as that heretofore described, and the connection is shown as fully made up, with the pin body 14 stabbed into the box, so that the tapered pin surface 15 and the lower end surface 16 of the pin are respectively engaged with the inner tapered box surface and the upwardly facing internal shoulder 19 of the box, with the tapered surfaces 15 and 18 interlocked by the pressure energized shrink fit produced by the application of pressure to the port 34, while the upwardly facing shoulder on the pin body 14 and the downwardly facing shoulder 21 on the box body 17 have been pulled towards one another by the tool T to preload the transverse surfaces 16 and 19 of the pin and box, respectively, and while the pressure fluid has been applied between the upper and lower sealing regions 37 and 38 between the pin and the box.

In this form the pin body 14 has an upwardly extended cylindrical section 314, at the upper end of which is the loading shoulder 20. The box body 17 has an upwardly extended cylindrical portion 317 which is internally threaded at 318 to receive the complemental threads 319 of an externally threaded sleeve 320, which is disposed within an annular space 321 between the pin and box extensions 314 and 317. At its upper end, the threaded sleeve 320 has a head 322 provided with a tool engaging opening or recess 323, whereby the sleeve 320 can be rotated. At its lower end the threaded sleeve 320 has a downwardly facing shoulder 324, and above the upper sealing section 37 of the connection, the pin body 14 has an upwardly facing shoulder 325. Disposed between the opposing shoulders 324 and 325 is a locking ring 326, the upper end of which is engaged by the shoulder 324 and split at 326a the lower end of which is engageable by the shoulder 325, so that with the connection held in a preloaded condition by application of the loading tool T to the pin shoulder 20 and the box shoulder 21 and with pressure applied to the connection through the port 34, the threaded sleeve can be rotated to axially load the ring 326 between the opposing lower end of the sleeve 320 and the upwardly facing box shoulder 325, to hold the connection in preloaded condition upon relief of the pressure fluid.

In the making up of the connection of FIG. 5, the locking ring 326, which is normally resiliently expansible outwardly, can rest on an upwardly facing, downwardly and inwardly inclined surface 326b in the box section 317 below the thread 318, when the locking sleeve 320 is threaded upwardly in the box extension. When the sleeve 320 is threaded downwardly, following initial stabbing of the pin into the box and the application of the preload force by the tool T and the application of pressure to the port 34, the locking ring 326 will be forced downwardly and cammed inwardly by engagement of the outer and lower bevel 326c thereon with the bevel 326b in the box. The locking ring 326 will then be compressively loaded between the lower end of the locking sleeve 320 and the pin shoulder 325, so that when the preload force of the tool T and the pressure energization are relieved, no relaxation of the connection can occur.

Referring to FIG. 6 another form of automatically engageable locking means L is incorporated in the connection C.

Here again, in this form, the connection comprises the pin P having the body 14 with its external tapered surface 15 and lower end surface 16 engaged with the box body section 17 at the inner tapered wall 18 and the lower inner and upwardly facing shoulder 19. The joint is shown in a fully made up condition with the pin and box preloaded and after the pressure fluid supplied through the port 34 has been relieved from between the upper and lower sealing sections 37 and 38 while the preload tool T engages the upwardly facing shoulder 20 on the pin and the downwardly facing shoulder 21 on the box. The locking means L, as in the previous embodiments, maintains the pressure energized and preloaded press fit.

In this form the locking means L includes a circumferentially extended split, resilient locking ring 450, split at 451 and normally circumferentially expansible in a circumferential groove 452, formed in the pin body 14 above the upper sealing section 37, outwardly into an internal groove 453 provided by the box in the upper extension 417 thereof. The lower outer corner of the lock ring 450 has a downwardly and inwardly beveled surface 454 engageable with an outwardly flaring surface 455 at the top of the box body extension 417, whereby upon stabbing of the pin into the box, the locking ring 450 will be cammed inwardly in the groove 452, as the ring passes downwardly through the internal bore 456 of the box assembly. The bore 456 is formed in an externally threaded sleeve 457 which is threadedly engaged at 458 within the internally threaded upper end of the box extension 417. The sleeve 457 may be retained in the box end 417 by an internal locking ring 458', and the upper end of the threaded sleeve has a head 459 provided with one or more tool engaging openings 460 whereby the sleeve can be rotated. At the lower end of the threaded sleeve 457 is the end face 457a which forms the upper downwardly facing wall of the lock ring receiving groove 453 and which opposes the upwardly facing shoulder 452a of the groove 452 in the pin P. The locking ring 450 is adapted to be loaded between the opposing shoulders 457a and 452a upon threaded rotation of the sleeve 457 in one direction. Such an assembly eliminates tolerances in the connection and the ring 450 can be substantially loaded axially by the ring 457 so that no relaxation can occur in the connection after it has been finally made up while axially preloaded by the loading tool and pressure energized by the application of fluid pressure to the region between the upper and lower seals 37 and 38. Thus, when the pressure is relieved following the loading of the lock ring 450 between the threaded sleeve 457 and the pin shoulder 452a, the joint is maintained in a pressure energized shrink fit condition with the pin and box shoulders 16 and 19 in compressive coengagement and with the box body in tension.

Referring to FIGS. 7 and 8, the locking means L for holding the preloaded connector C aginst loosening is in the form of a resilient, split lock ring 550, split at 551, so as to enable its expansion from an external groove 552 in the pin body 14 into the internal groove 553 within the upper end of the box body 17, while the pin and box are held in compression and tension respectively by the application of the loading tool T to the opposing pin shoulder 20 and box shoulder 21, as pressure fluid is applied through the port 34 between the axially spaced sealing portions 37 and 38 of the tapered pin and box surfaces 15 and 18, so that when the pressure fluid is relieved, the lower end 16 of the pin is pressure loaded against the upwardly facing box shoulder 19 and the opposing tapered pin and box walls 15 and 18 are coengaged with the pressure energized press fit.

In this form the lock ring 550 may be normally resiliently expansible for engagement in the box groove 553, and has an outer and lower beveled surface 554 engageable with the flared mouth 555 at the upper end of the box whereby the lock ring 550 is contracted inwardly to pass downwardly through the upper end of the box and then expand into the groove 553 as the pin is being stabbed into the box. To enable stabbing of the pin into the box, the groove 552 of the pin is defined by an internally threaded sleeve 557 threadedly connected at 558 to an upward extension 514 of the pin body 14. This threaded sleeve 557 has an external downwardly tapering conical surface 559 adjacent its lower end engageable within the tapered inner surface 560 of the lock ring 550 when the sleeve 557 is threaded downwardly, as shown to best advantage in FIG. 8, but, when the sleeve 557 is threaded upwardly on the pin extension 514 to the broken line position of FIG. 8, then the split lock ring 550 can be inwardly contracted by the coengaging tapered surface 554 on the ring and the flared throat of the box. Alternatively, the lock ring 550 may be normally contracted to the broken line position of FIG. 8 and expansible by the conical surfaces 559 and 560 of the locking sleeve and ring. When the joint parts have been preloaded, as previously described, and the threaded sleeve 557 is rotated by suitable tool means (not shown) applicable to one or more openings 561 adjacent the top of the threaded sleeve, the opposing tapered sleeve surfaces 559 and ring surface 560 will cause the lock ring to be loaded outwardly.

In order to effect an axial loading of the ring 550, the upper wall 562 of the box which forms the internal groove 553 is disposed at an angle extending outwardly and downwardly for wedging coengagement with the upper end surface 563 of the lock ring 550 which extends at angle downwardly and outwardly, whereby to provide a wedge action forcing the ring 550 downwardly against the upwardly facing shoulder 564 which defines the bottom wall of the external groove 552 of the pin.

Thus, when the threaded sleeve 557 wedges the lock ring 550 outwardly into the groove 553, the lock ring 550 is axially loaded between the downwardly facing box shoulder 562 and the upwardly facing pin shoulder 564 so that no relaxation can occur within the connection when the pressure fluid is relieved at the port 34.

In this construction in order to enable assembly, the thrust shoulder 20 on the box is formed on a threaded collar 564 which is threaded onto the threaded upper extension 514 of the pin body 14, after the threaded sleeve 557 is applied to the upper pin section 514. The thrust collar or ring 564 is appropriately locked in place as by suitable set screws 565 engaged between the collar and the pin body, and limits upward threaded movement of locking sleeve 557 to the broken line position of FIG. 8, where the lock ring 550 is contracted but engageable by the wedge surface 559 of the locking sleeve.

From the foregoing it will now be apparent that the present invention provides a pipe connector for use in making up lengths of pipe such as piles and pipelines wherein the pressure energization of the fit between the tapered pin and box members and the axial preloading of the pin P against the inner shoulder of the box while the box is held in tension results in the production of a rigidized pipe joint of superior strength and durability and which can be readily and quickly made up utilizing the usual pipe handling and supporting equipment provided on drilling rigs and barges and with the pipe sections disposed vertically or at some batter angle. The locking ring means hold the parts against axial separation. Such rings are substantially circumferentially continuous, and, therefore, distribute the loading forces about the entire connector, but ring segments or dogs may also be employed and arranged in circumferentially spaced relation and suitably biased inwardly or outwardly.

I claim:

1. A rigid pipe connector comprising: a pin and a box; said pin having an externally tapered section and a transverse make up shoulder; said box having an internally tapered body section to receive the tapered section of said pin and having an open end and an inner transverse make up shoulder confronting said pin make up shoulder; said pin section and said box section having therebetween axially spaced companion tapered sealing portions; said box section having port means between said sealing portions for admission therebetween of a pressure fluid acting to circumferentially expand said box section and compress said pin section; and means on said pin and box engageable by a loading tool for axially relatively forcing said sections and compressively loading said make up shoulders while said pressure fluid is acting on said sections; said pin and box sections being held against axial separation with said make up shoulders in compression and said box section in tension by a pressure energized shrink fit between said pin section and said box section upon relief of said pressure fluid; and locking means coacting between said pin and box to hold said pin in compression and said box in tension including opposed locking shoulders on said pin and said box adjacent to the open end of said box and a locking member compressively disposed between said locking shoulders; said tapered pin and box sections being between said locking means and said make up shoulders.

2. A rigid pipe connector as defined in claim 1; wherein said locking shoulders extend circumferentially of said pin and box and said locking member comprising ring means extending circumferentially between said locking shoulders.

3. A rigid pipe connector as defined in claim 1; wherein said locking member and said pin and box have means for compressively loading said locking member.

4. A rigid pipe connector as defined in claim 1; wherein said locking member and said pin and box have means for compressively loading said locking member, including wedge surfaces on said locking member and one of said locking shoulders for compressing said member in response to lateral movement of said locking member with respect to said one of said locking shoulders, and means for forcing said locking member laterally.

5. A rigid pipe connector as defined in claim 1, wherein said locking member and said pin and box have means for compressively loading said locking member, including means for moving one of said locking shoulders towards the other.

6. A rigid pipe connector as defined in claim 1; wherein said locking member and said pin and box have means for compressively loading said locking member, including wedge surfaces on said locking member and one of said locking shoulders for compressing said member in response to lateral movement of said locking member with respect to said one of said locking shoulders, and means for forcing said locking member laterally, including an actuator member threadedly connected to one of said pin and box and engaged with said locking member to force said wedge surfaces into engagement.

7. A rigid pipe connector as defined in claim 1; wherein said locking shoulders extend circumferentially of said pin and box, said locking member being in the form of a ring disposed between said locking shoulders.

8. A rigid pipe connector as defined in claim 7; wherein said ring is split and resiliently expansilbe and contractible for engagement with said locking shoulder on one of said pin and said box, the other of said pin and said box having a circumferential groove formed by the other of said locking shoulders as deep radially as the thickness of said ring, and said ring and one of said pin and said box having means for camming said ring resiliently into said groove as said pin and said box are stabbed together.

9. A rigid pipe connector as defined in claim 7; wherein one of said pin and said box has a sleeve threadedly mounted thereon and having one of said locking shoulders thereon, and including means on said sleeve engageable by a tool for rotating said sleeve to move said one of said locking shoulders towards the other locking shoulder.

10. A rigid pipe connector comprising: a pin and a box; said pin having an externally tapered section and a transverse make up shoulder; said box having an internally tapered body section to receive the tapered section of said pin and having an inner transverse make up shoulder confronting said pin make up shoulder; said pin section and said box section having therebetween axially spaced companion tapered sealing portions; said box section having port means between said sealing portions for admission therebetween of a pressure fluid acting to circumferentially expand said box section and compress said pin section; and means on said pin and box engageable by a loading tool for axially relatively forcing said sections and compressively loading said make up shoulders while said pressure fluid is acting on said sections; said pin and box sections being held against axial separation with said make up shoulders in compression by a pressure energized shrink fit between said pin section and said box section upon relief of said pressure fluid; and locking means coacting between said pin and box to hold said pin in compression and said box in tension including opposed locking shoulders on said pin and said box and a locking member compressively disposed between said locking shoulders; said locking shoulders extending circumferentially of said pin and box adjacent to the open end of said box, said locking member being in the form of a resiliently expansible and contractible split ring, said pin having a circumferential groove bordered by one of said locking shoulders and receiving said ring, said box having a circumferential groove therein bordered by the other of said locking shoulders, said ring being expanded outwardly onto said groove in said box and engaged between said shoulders.

11. A rigid pipe connector comprising: a pin and a box; said pin having an externally tapered section and a transverse make up shoulder; said box having an internally tapered body section to receive the tapered section of said pin and having an inner transverse make up shoulder confronting said pin make up shoulder; said pin section and said box section having therebetween axially spaced companion tapered sealing portions; said box section having port means between said sealing portions for admission therebetween of a pressure fluid acting to circumferentially expand said box section and compress said pin section; and means on said pin and box engageable by a loading tool for axially relatively forcing said sections and compressively loading said make up shoulders while said pressure fluid is acting on said sections; said pin and box sections being held against axial separation with said make up shoulders in compression by a pressure energized shrink fit between said pin section and said box section upon relief of said pressure fluid; and locking means coacting between said pin and box to hold said pin in compression and said box in tension including opposed locking shoulders on said pin and said box and a locking member compressively disposed between said locking shoulders; said locking shoulders extending circumferentially of said pin and box adjacent to the open end of said box, said locking member being in the form of a resiliently expansible and contractible split ring, said box having an internal groove bordered by one of said locking shoulders into which said ring is expansible, said pin having a circumferential groove bordered by the other of said locking shoulders into which said ring is contractible, and a plurality of circumferentially spaced screws carried by said box and engageable with said ring to force said ring inwardly into said groove in said pin and between said locking shoulders.

12. A rigid pipe connector as defined in claim 11; wherein; one of said locking shoulders and said ring have companion angular surfaces for compressing said ring between said locking shoulders upon movement of said ring into said groove in said pin.

13. A rigid pipe connector as defined in claim 1; wherein said locking shoulders extend circumferentially of said pin and box said locking member being in the form of a ring disposed between said shoulders, said box having a sleeve threadedly connected thereto and having an end forming one of said locking shoulders, and tool engaging means on said sleeve for enabling said sleeve to be rotated to force the locking shoulder thereon towards the other of said locking shoulders on said pin with said ring compressed therebetween.

14. A rigid pipe connector as defined in claim 1; wherein said locking shoulders extend circumferentially of said pin and box, said locking member being in the form of a ring disposed between said shoulders, said box having a sleeve threadedly connected thereto and having an end forming one of said locking shoulders, and tool engaging means on said sleeve for enabling said sleeve to be rotated to force the locking shoulder thereon towards the other of said locking shoulders on said pin with said ring compressed therebetween, said ring being a resiliently expansible and contractible split ring, said pin having a circumferentially extended groove bordered by one of said locking shoulders and receiving said split ring, said groove being radially deeper than the thickness of said ring, and said threaded sleeve and said ring having means for resiliently contracting said ring upon stabbing of said pin and said box together.

15. A rigid pipe connector as defined in claim 1; wherein said locking shoulders extend circumferentially of said pin and box, said locking member being in the form of a resiliently expansible and contractible split ring disposed between said shoulders, one of said pin and said box having a circumferentially extended groove bordered by one of said locking shoulders, the other of said pin and said box having a threaded sleeve thereon, said sleeve and said ring having confronting angular surfaces for circumferentially moving said ring into engagement with said locking shoulders upon threaded movement of said sleeve on said one of said pin and said box.

16. A rigid pipe connector as defined in claim 1; wherein said locking shoulders extend circumferentially of said pin and box, said locking member being in the form of a resiliently expansible and contractible split ring disposed between said shoulders, one of said pin and said box having a circumferentially extended groove bordered by one of said locking shoulders, the other of said pin and said box having a threaded sleeve thereon, said sleeve and said ring having confronting angular surfaces for circumferentially moving said ring into engagement with said locking shoulders upon threaded movement of said sleeve on said one of said pin and said box, and one of said locking shoulders and said ring having angularly disposed coengaged surfaces compressing said ring between said locking shoulders upon such movement of said ring.

17. A rigid pipe connector as defined in claim 1; wherein said locking shoulders extend circumferentially of said pin and box, said locking member being in the form of a normally contracted and resiliently expansible split ring, said pin having a sleeve threaded thereon in axially spaced relation to the locking shoulder on said pin and axially moveable on said pin relative to said locking shoulder to form a groove normally receiving said ring, said box having a circumferentially extended groove bordered by the other of said locking shoulders, and means on said sleeve and said ring for expanding said ring into engagement between said locking shoulders upon threaded movement of said sleeve along said pin.

18. A rigid pipe connector as defined in claim 1; wherein said locking shoulders extend circumferentially of said pin and box, said locking member being in the form of a normally contracted and resiliently expansible split ring, said pin having a sleeve threaded thereon in axially spaced relation to the locking shoulder on said pin and axially moveable on said pin relative to said locking shoulder to form a groove normally receiving said ring, said box having a circumferentially extended groove bordered by the other of said locking shoulders, and means on said sleeve and said ring for expanding said ring into engagement between said locking shoulders upon threaded movement of said sleeve along said pin, said locking shoulder on said box and said ring having coengagable wedge surfaces for loading said ring against said locking shoulder on said pin upon expansion of said ring into said groove in said box.

19. The method of making rigid pipe connections comprising: axially coengaging tapered pin and tapered box connector parts and disposing opposing axially spaced sealing portions thereof in sealing relation and transversely disposed makeup shoulders thereof in opposing initial confronting relation, compressively loading said makeup shoulders together by applying opposite axial forces to said pin and box placing said pin in compression and said box in tension while circumferentially expanding said box and compressing said pin by the application of pressure fluid therebetween between said sealing portions thereof, locking said pin and box together against axial separation by locating a locking member carried by one of said pin and box between opposed axially spaced locking shoulders on said pin and box, and then relieving said pressure fluid to allow shrinking of said box and expansion of said pin into interlocking relation with said pin and box respectively held in axial compression and tension and with said locking member compressively loaded between said locking shoulders.

20. The method of claim 19; wherein said locking member is located between said shoulders by applying said opposite axial forces to said pin and box.

21. The method of claim 19; including axially preloading said locking member between said locking shoulders while locating said locking member.

22. The method of claim 19; said locking member being a resilient circumferentially expansible and retractible split ring and said shoulders extending circumferentially of said pin and box, including the step of locating said ring by forcing said ring circumferentially between said shoulders.

23. The method of claim 19; said locking member being a resilient circumferentially expansible and retractible split ring and said shoulders extending circumferentially of said pin and box, including the step of locating said ring by forcing said ring circumferentially between said shoulders, and axially compressing said ring between said shoulders.

24. The method of claim 19; said locking member being a resilient circumferentially expansible and retractible split ring and said shoulders extending circumferentially of said pin and box, including the step of locating said ring by forcing said ring circumferentially between said shoulders, by threading a sleeve on one of said pin and box into engagement with said ring.

25. The method of claim 19; said locking member being a resilient circumferentially expansible and retractible split ring and said shoulders extending circumferentially of said pin and box, including the step of locating said ring by forcing said ring circumferentially between said shoulders, by threading a sleeve on one of said pin and box into engagement with said ring, said sleeve having one of said locking shoulders thereon movable towards the other locking shoulder.

26. The method of claim 19; said locking member being a resilient circumferentially expansible and retractible split ring and said shoulders extending circumferentially of said pin and box, including the step of locating said ring by forcing said ring circumferentially between said shoulders, by threadding a sleeve on one of said pin and box into engagement with said ring, and simultaneously compressing said ring between said locking shoulders.

* * * * *